US008625476B2

(12) United States Patent
Kim et al.

(10) Patent No.: US 8,625,476 B2
(45) Date of Patent: Jan. 7, 2014

(54) MOBILITY MANAGEMENT SYSTEM AND METHOD FOR DISTRIBUTED MOBILITY MANAGEMENT NETWORK

(75) Inventors: Young-Han Kim, Seoul (KR); Se-il Jeon, Seoul (KR)

(73) Assignee: Soongsil University Foundation of University-Industry Cooperation, Seoul (KR)

( * ) Notice: Subject to any disclaimer, the term of this patent is extended or adjusted under 35 U.S.C. 154(b) by 152 days.

(21) Appl. No.: 13/304,487

(22) Filed: Nov. 25, 2011

(65) Prior Publication Data

US 2013/0089018 A1 Apr. 11, 2013

(30) Foreign Application Priority Data

Oct. 5, 2011 (KR) .......................... 10-2011-0101353
Oct. 5, 2011 (KR) .......................... 10-2011-0101376

(51) Int. Cl.
  *H04H 20/71* (2008.01)
(52) U.S. Cl.
  USPC .......................................... 370/312; 370/331
(58) Field of Classification Search
  USPC ............... 370/310.2, 312, 328, 331, 338, 349
  See application file for complete search history.

(56) References Cited

U.S. PATENT DOCUMENTS

| | | | | |
|---|---|---|---|---|
| 8,059,625 B2 * | 11/2011 | Cai | ............................... | 370/341 |
| 8,289,962 B2 * | 10/2012 | Fourcand | ...................... | 370/389 |
| 8,385,249 B2 * | 2/2013 | Sarikaya | ....................... | 370/312 |
| 8,391,226 B2 * | 3/2013 | Rune | ............................. | 370/329 |
| 2010/0189037 A1 * | 7/2010 | Lee et al. | ....................... | 370/328 |
| 2010/0202357 A1 * | 8/2010 | Kim et al. | ...................... | 370/328 |

OTHER PUBLICATIONS

US 8,520,581, 08/2013, Lu et al. (withdrawn)*

* cited by examiner

*Primary Examiner* — Brenda H Pham
(74) *Attorney, Agent, or Firm* — Sherr & Jiang, PLLC

(57) ABSTRACT

The present invention relates to a mobility management system and method for distributed mobility management network providing initial connection and handoff processes of mobile nodes to support IP multicast, and a method of selecting agents and networks to receive multicast data by anchor agents in the distributed mobility management network, comprising: a mobile node receiving network access services by conducting wireless communications in the distributed mobility management network through the wireless transmitter-receiver as a device consists of a wireless transmitter-receiver, an antenna and a control unit; a mobility management anchor agent supporting the mobility of the above mobile node, and taking the role of anchor each time the mobile node moves; a mobility management information server receiving information on agent or network transmitting multicast channel and data currently received from the above mobility management anchor agent, and then registering and updating the information.

4 Claims, 6 Drawing Sheets

MOBILITY MANAGEMENT SYSTEM AND METHOD FOR DISTRIBUTED MOBILITY MANAGEMENT NETWORK

CROSS REFERENCE TO PRIOR APPLICATIONS

The present application claims priority under 35 U.S.C. §119 to Korean Patent Application Nos. 10-2011-0101353 (filed on Oct. 5, 2011) and 10-2011-0101376 (filed on Oct. 5, 2011), which are all hereby incorporated by reference in their entirety.

BACK GROUND OF THE INVENTION

1. Field of the Invention

This invention relates to a network mobility management apparatus and method for distributed mobility management network, and more particularly, to initial connection and handoff processes of mobile nodes to support IP multicast, and a method of selecting agents and networks to receive multicast data by anchor agents in the distributed mobility management network.

2. Description of the Related Art

In the conventional internet, one IP (Internet Protocol) address consists of a network identifier and a host identifier is assigned to hosts; a network identifier is an information to uniquely show the location of hosts at the network and a host identifier is an information to uniquely identify hosts on the network.

Accordingly, hosts create a socket address from the above IP address and transport layer port number, and establish a connection with other hosts using this socket address. And, if hosts establish a connection with other hosts, the same IP address should be retained indefinitely while maintaining their connection.

In the case that hosts move from one network to another, the IP address assigned to hosts should be changed since a network identifier should be changed. The existing connection will be disconnected since changing IP address means changing socket address, and thus need to retry for a valid connection.

To solve this disconnection problem occurring when hosts connect to the internet by changing network, a mobile IP technology has been proposed to maintain existing connections even though mobile nodes (MN) change its location. In mobile IP protocol, mobile nodes perform the actions as specified in the Mobile IP protocol when it is detected to be moving from one network to another. In other words, it can be said that mobile IP protocol is a mobile node-based mobility support protocol.

On the other hand, there is a problem in that the mobile nodes without implementing mobile IP functions should disconnect existing connections and retry for a valid connection each time mobile nodes move from one network to another. To solve this problem, a technology for supporting mobility of mobile nodes over an access network has been proposed to maintain existing connections, even if the mobile nodes without implementing mobile IP functions move. This technology is called a network-based mobility management scheme.

FIG. 1 is a block diagram showing an example of system adopting conventional network mobility management scheme, it shows system adopting mobility management scheme in a centralized mobility management protocol.

As shown in FIG. 1, the network mobility management system comprises an anchor router (10), a kind of anchor managing mobile node mobility, an access router (20)(30), kind of access gateway receiving connection requests from mobile nodes, and a mobile node (40)(50).

At this point, the above mobile node (40)(50) includes mobile communication terminal, PDA, notebook and others capable of wireless communication through the wireless transmitter-receiver as a device consists of a wireless transmitter-receiver, an antenna and a control unit. And, the mobile node (40)(50) receives network access services by connecting to the access router (20)(30) through a wireless connection with the base station in the centralized mobility management protocol.

The above access router (20)(30), a device for supporting mobility of the mobile node (40)(50) in place of the mobile node (40)(50), transmits a binding message to the anchor router (10) with detecting a movement of the mobile node (40)(50). The anchor router (10) processes the binding message and provides the access router (20)(30) with the network prefix information of mobile node if the mobile node is successfully registered with the network.

The above anchor router (10) acts on the internal network as a kind of home agent for the mobile node (40)(50). Home agent is an agent performs such as storing the bindings of the CoA (Care-of address), which temporarily represents the location of mobile nodes moving in the mobile IP technology, and the HoA (Home Address).

Anchor router (10) updates a binding information with receiving from the access router (20)(30) a binding message having such information on through which access router the connection route is established; and establishes, maintains and terminates the mobile node (50) and the connection route based on the binding information.

So, the conventional network mobility management scheme is a centralized mobility management scheme managing mobile node mobility focusing the anchor router (10) as it appears in FIG. 1, wherein the anchor router (10) located logically above in the access router (20)(30) performs anchor functions to provide IP session continuity each time a mobile node moves to another access router (20)(30). It brings data processing overload and stability problems since in such a centralized mobility management scheme, every packet is focused on one anchor node, the anchor router (10).

SUMMARY OF THE INVENTION

The present invention is conceived to solve the above-described problems. An object of the present invention is to provide a mobility management system and method for distributed mobility management network providing initial connection and handoff processes of mobile nodes to support IP multicast, a method of selecting agents and networks to receive multicast data by anchor agents in the distributed mobility management network.

Another object of the present invention is to provide plans to support the mobility management coupled with the IP multicasting technology, for providing real-time multimedia services in the distributed mobility management structure environment wherein each time a mobile node moves, currently connected access router takes the role of anchor.

In order to attain the above-described object, a mobility management system for distributed mobility management network according to the present invention comprising: a mobile node receiving network access services by conducting wireless communications in the distributed mobility management network through the wireless transmitter-receiver as a device consists of a wireless transmitter-receiver, an antenna and a control unit; a mobility management anchor agent supporting the mobility of the above mobile node, and taking the role of anchor each time the mobile node moves; a mobility management information server receiving information on agent or network transmitting multicast channel and data currently received from the above mobility management anchor agent, and then registering and updating the information.

Desirably, it comprises multiple content sources, and further comprises content provider network capable of multicast routing to supply the content.

Desirably, the above mobility management information server checks whether the above mobility management anchor agent currently receives the relevant channel or not, and controls change multicast channel reception to a content provider network.

Desirably, the above mobility management anchor agent detects a movement of the mobile node by transmitting advertising messages to the above mobile node; establishes and updates binding messages having information on a connection route of the mobile node; and establishes, maintains and terminates a connection route of the mobile node based on the binding information.

In order to attain the above-described object, a feature of a mobility management method for distributed mobility management network according to the present invention, in providing a network-based mobility comprised of a mobility management anchor agent supporting mobility of the mobile node at its initial connection and a mobility management information server receiving information on agent or network transmitting multicast channel and data currently received from the mobility management anchor agent, comprising the steps of: requesting a registration by delivering a registration request message including ID of mobile node 1 connected by the mobility management anchor agent 1 (MMAA) to the mobility management information server (MMIS); receiving from MMIS a registration reply message by the above MMAA 1, providing multicast channel information capable of being received by the connected 1 mobile node with transmitting MLD Query message to the registered mobile node 1, and then checking whether join the multicast channel or not; the above MMAA 1 receiving, through the above mobile node 1, multicast channel information of its choice included on the MLD Report message in respond to the MLD Query message, and then transmitting aggregated MLD Report message to the content provider network; receiving and registering information on currently received multicast channel transmitted from the above MMAA 1 by the above MMIS, transmitting agent or network.

Desirably, the above MMAA 1 and MMAA 2 have MLD proxy functions specified in IETF RFC 4605.

In order to attain the above-described object, another feature of a mobility management system and method for distributed mobility management network according to the present invention, in providing a network-based mobility comprised of a mobility management anchor agent supporting mobility of the mobile node in the case of handoff between the mobility management anchor agent 1 (MMAA) and the mobility management anchor agent 2 (MMAA) depending on a movement of the mobile node receiving the multicast streaming, and a mobility management information server receiving information on agent or network transmitting multicast channel and data currently received from the mobility management anchor agent, comprising the steps of: (a) requesting a registration by delivering a registration request message including ID of the connected 1 mobile node to the mobility management information server (MMIS) by MMAA 2 detecting connection of 1 mobile node as 1 mobile node moves from MMAA to 2 MMAA 2; (b) updating cache entries in 1 mobile node by requesting binding cache updating to MMAA 1 wherein mobile node 1 was previously registered by the above MMIS; (c) confirming by the above MMIS that mobile node 1 is a multicast receiving node through cache entries updating in the above mobile node 1, and delivering an upper connection agent information for receiving multicast data with a registration reply message on the above registration request message to MMAA 2; (d) judgment stage 1 confirming by the above MMIS if there are any channels connected to the above MMAA 1 and the currently connected MMAA 2; (e) 2 judgment stage judging by the above MMIS if there is another mobile node under MMAA 1 after handoff of the mobile node 1 (110); (f) delivering stage 1 delivering the aggregated MLD Report message to the content provider network when it is confirmed that there is no channels connected to MMAA 1 and currently connected MMAA 2, and confirmed that there is no other mobile nodes under MMAA 1 by the results of judgment stage 1 and judgment stage 2; (g) delivering stage 2 forwarding the data, which is received by forming the tunnel between MMAA 1 and currently connected MMAA 2, to MMAA 2 when it is confirmed that if there exist channels connected to MMAA 1 and currently connected MMAA 2, or confirmed that there exist other mobile nodes under MMAA 1 by the results of judgment stage 1 and judgment stage 2; (h) receiving and registering information on currently received multicast channel transmitted from the above MMAA 2 by the above MMIS, transmitting agent or network.

Desirably, after the above step (h), comprises the stages of: requesting a registration by delivering a registration request message including ID of the mobile node 2 connected by mobility management anchor agent 2(MMAA) to the mobility management information server (MMIS); receiving from MMIS a registration reply message by the above MMAA 2, providing multicast channel information capable of being received by the connected mobile node 2 with transmitting MLD Query message to the registered mobile node 2, and then checking whether join the multicast channel or not; by the above MMAA 2, receiving, through the above mobile node 2, multicast channel information of its choice included on the MLD Report message in respond to the MLD Query message, and providing multicast services by checking the current MLD proxy database and transmitting aggregated MLD Report message of the relevant channel to MMAA 1 using the tunnel formed between MMAA 1 and currently connected MMAA 2; receiving and registering information on currently received multicast channel transmitted from the above MMAA 2 by the above MMIS, transmitting agent or network.

Desirably, after the above step (h), when the event of withdrawal of all the mobile nodes happens, comprises the stages of: providing a MLD Report withdrawal message to MMIS by MMAA 1; delivering, through a receiving channel registration reply message, an upper connection multicast agent information changed by the above MMIS to MMAA 2; changing the multicast data route so that MMAA 2 directly receives the multicast data without MMAA 1 by transmitting the aggregated MLD Report message including the above receiving channel registration reply message to the content provider network by MMAA 2; receiving multicast data between MMAA 2 and content provider network without a tunnel between MMAA 1 and MMAA 2 (140); receiving and registering information on currently received multicast channel transmitted from the above MMAA 2 by the above MMIS, transmitting agent or network.

The mobility management system and method for distributed mobility management network according to the present invention, as explained above, is effective in preventing wasting bandwidth from unnecessary data transmission by providing effective multicast delivery without unnecessary packet duplication using procedures of calculating and informing proper transmitting node information using the multicast transmitting node information classified by current channel with providing real-time multimedia transmission method using IP multicast techniques in the distributed mobility management network. In other words, it provides a way to determine where each mobility management agent receives multicast data between upper transmitting agents or multicast networks.

THE BRIEF DESCRIPTION OF THE DRAWINGS

DESCRIPTION OF THE PREFERRED EMBODIMENT

Other objects, features and advantages of the present invention will be clarified hereinafter through detailed description on the embodiments with reference to the accompanying drawings.

Hereinafter, preferred embodiment of a mobility management system and method for distributed mobility management network according to the present invention will be described in detail with reference to the accompanying drawings.

The embodiments described below are provided to fully initiate the present invention and to fully inform the scope of the invention to one having ordinary skill in the art but are not intended to limit the scope of the present invention. One ordinarily skilled in the art can make various changes and modifications within the scope of the present invention.

Therefore, the embodiments described in the specification and structures shown on the drawings are simply the most desirable examples of the present invention, not represent every technical spirit in the present invention. Therefore, it is necessary to understand that there can be various equivalents and modifications at the point of filing.

Figure 1:
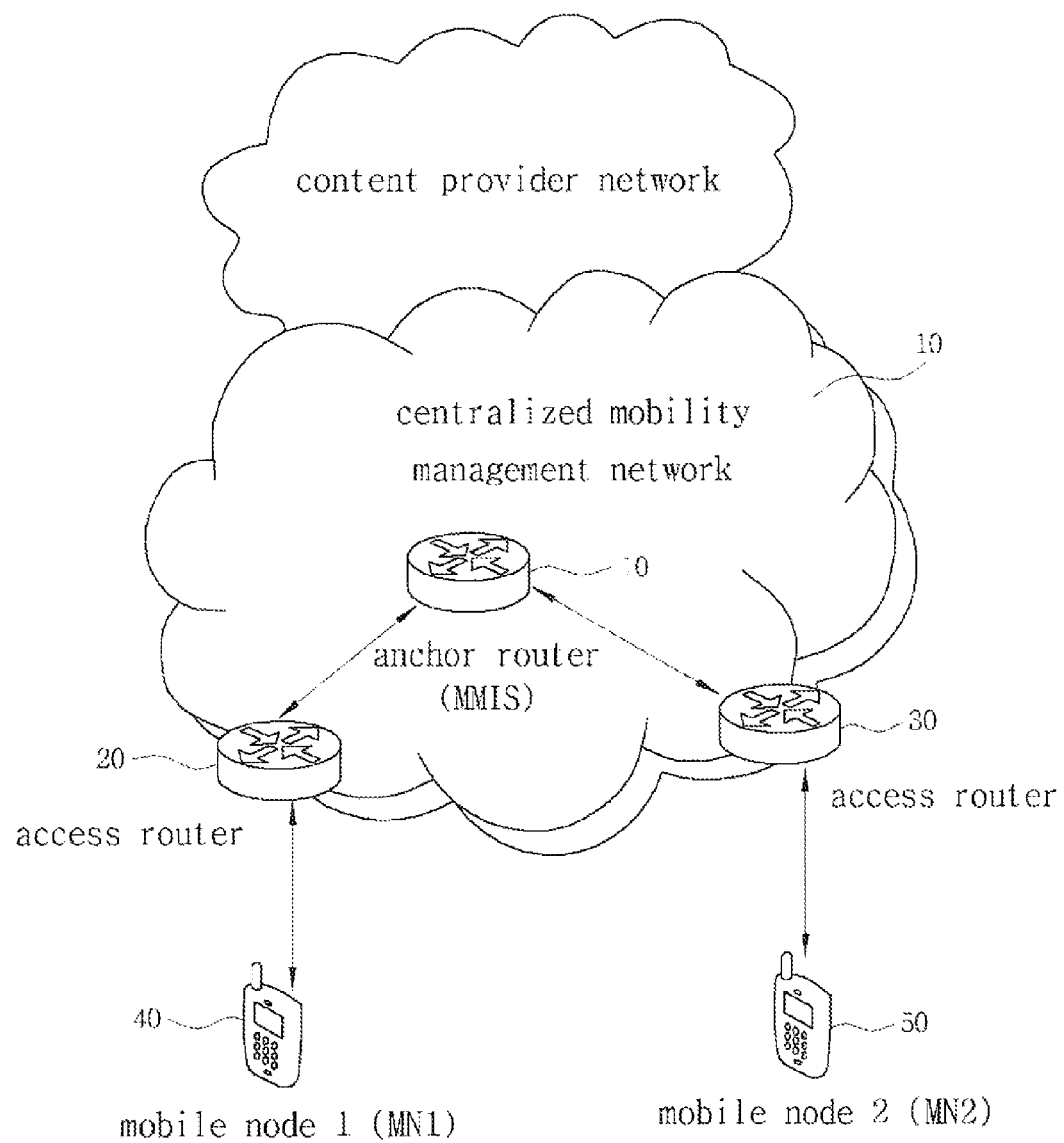
FIG. 1 is a block diagram showing an example of system adopting conventional network mobility management scheme.
Figure 2:
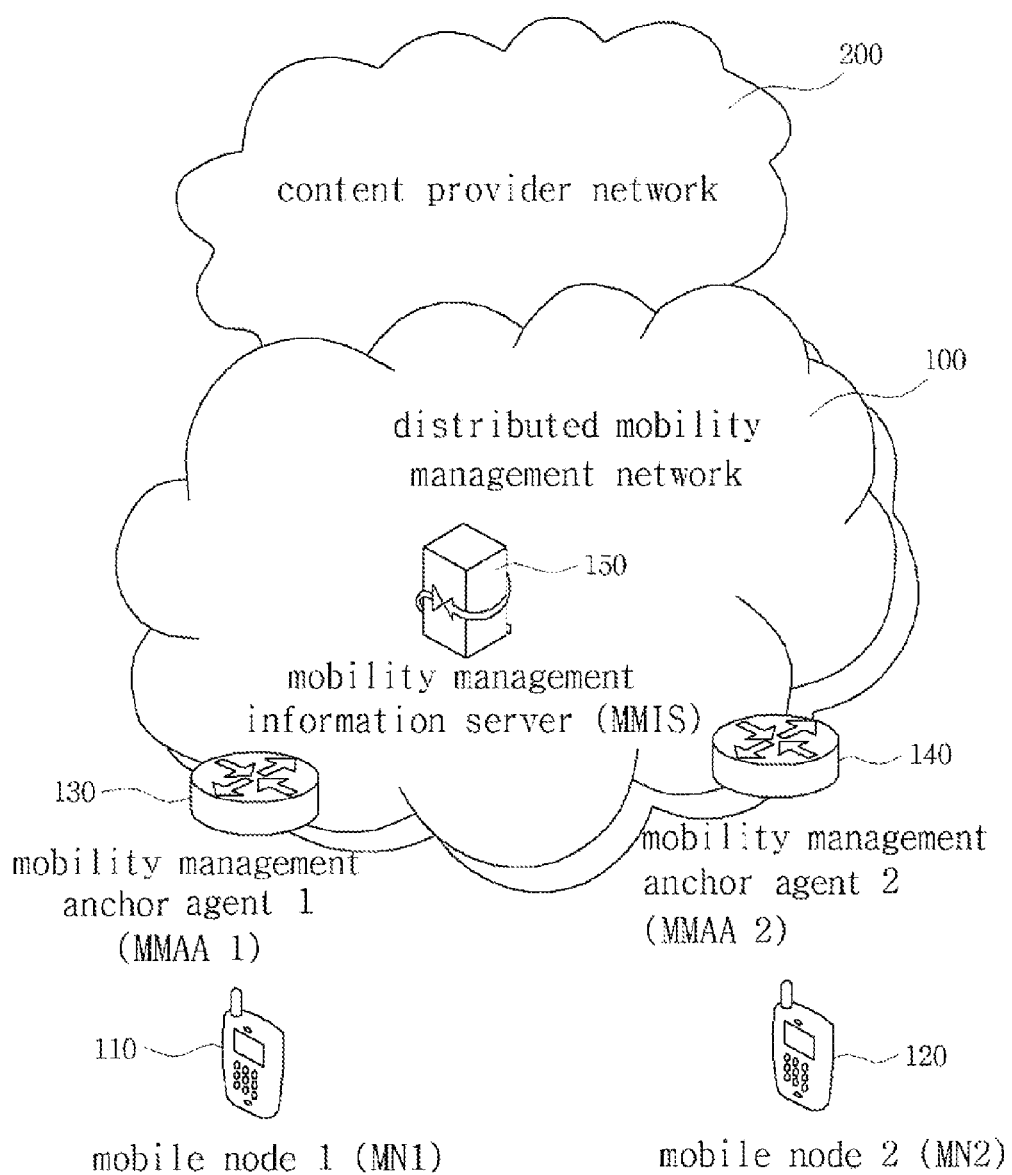
FIG. 2 is a block diagram showing the structure of a mobility management system for distributed mobility management network according to the preferred embodiments of the present invention.

FIG. 2 is a block diagram showing the structure of mobility management system for distributed mobility management network according to the preferred embodiments of the present invention.

As shown in FIG. 2, a mobility management system comprises a mobile node (110)(120), a mobility management anchor agent (130)(140), a mobility management information server (150) and multiple content sources, and represents an environment comprising a content provider network capable of multicast routing to provide contents.

The above mobile node (110)(120) is a device includes mobile communication terminal, PDA, notebook and others capable of wireless communication through the wireless transmitter-receiver as a device consists of a wireless transmitter-receiver, an antenna and a control unit.

And, network access services are provided to the mobile node (110)(120) by connecting the mobility management anchor agent (130)(140) through a wireless connection with the base station in the distributed mobility management network. The mobile node (110)(120) configures its IP address by receiving the advertising message of the mobility management anchor agent (130)(140).

The above mobility management anchor agent (130)(140), in place of the node (110)(120), supports a mobility of the mobile node (110)(120), and currently connected mobility management anchor agent (130)(140) takes the role of anchor each time the mobile node moves. In other words, it detects a movement of the mobile node (no)(120) by receiving the advertising message to the mobile node (110)(120); establishes and updates binding messages having information wherein the connection route of the mobile node (110)(120) is established; and establishes, maintains and terminates the connection route of the mobile node (110)(120) based on the binding information.

The above mobility management information server (150) receives information on agent or network transmitting multicast channel and data currently received from the mobility management anchor agent (130)(140), and then registering and updating the information. And, the above mobility management information server (150) checks whether the mobility management anchor agent (130)(140) currently receives the relevant channel or not, and controls change multicast channel reception to the content provider network (200).

Hereinafter, the mobility management method for distributed mobility management network according to the present invention will be described in detail with reference to the accompanying drawings. The same reference numerals as FIG. 2 are used to designate the same elements performing the same functions.

Figure 3:
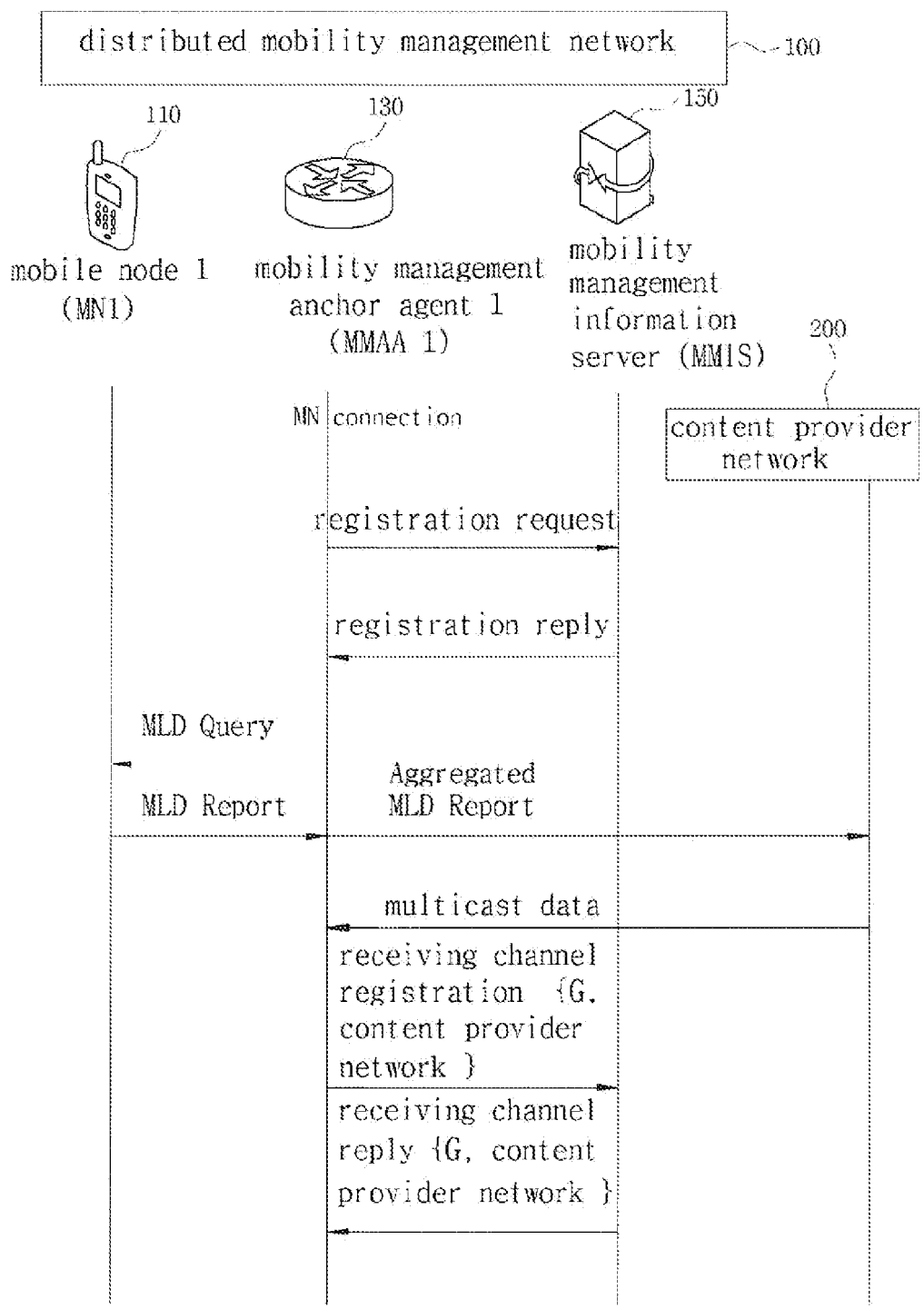
FIG. 3 is a flowchart illustrating an initial connection process in the case that the mobile node according to the present invention connects to the distributed mobility management network.

FIG. 3 is a flowchart illustrating an initial connection process in the case that the mobile node according to the present invention connects to the distributed mobility management network. Initial connection process of the mobile node for receiving IP multicast-based streaming in the distributed mobility management network will be described in detail with reference to FIG. 3

First, as the mobile node 1 (110) connects to the mobility management anchor agent 1 (MMAA)(130), MMAA 1 (130) delivers a registration request message including ID of the mobile node (110) to the mobility management information server (MMIS)(130), and receives a registration reply message. For reference, it is supposed that MMAA 1 and MMAA 2 have MLD proxy functions specified in the IETF RFC 4605.

Therefore, the above MMAA 1 (130) checks whether join the multicast channel or not by providing multicast channel information capable of being received by the mobile node 1 (110) connected to the MMAA 1 (130) with transmitting MLD Query message (advertising message) to the mobile node 1 (110) registered with the MMIS (150).

And then, the above mobile node 1 (110) transmits to the above MMAA 1 (130) the multicast channel information want to receive through the MLD Report message in respond to the MLD Query message, and then the above MMAA 1 (130) transmits aggregated MLD Report message to the content provider network (200).

Since then, the MMAA 1 (130) transmits information on currently received multicast channel, transmitting agent or network to the MMIS (150), the above MMIS (150) registers information on the multicast channel transmitted from the MMAA 1 (130), transmitting agent or network, and also performs update compared to previously registered contents.

Figure 4:
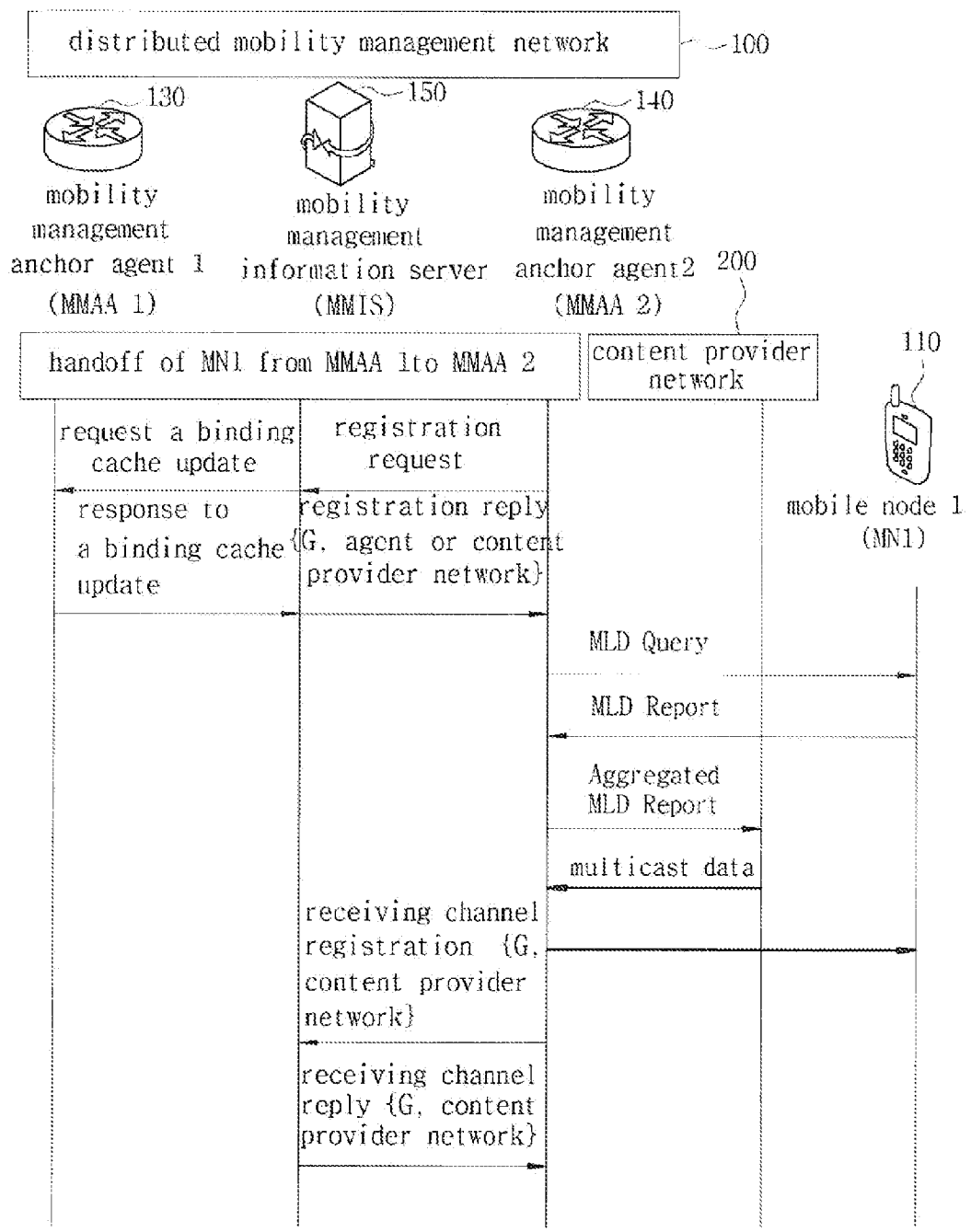
FIG. 4 is a flowchart illustrating a handoff process of the mobile node according to the present invention.

FIG. 4 is a flowchart illustrating a handoff process of the mobile node according to the present invention. Handoff process of the mobile node 1 (110), which receives multicast streaming in the distributed mobility management network, from MMAA 1 (130) to MMAA 2 (140) will be described in detail with reference to FIG. 4.

First, as the mobile node 1 (110) moves from MMAA 1 (130) to MMAA 2 (140), the MMAA 2 (140) detecting connection of the mobile node 1 delivers a registration request message including ID of the mobile node 1 (110) to the mobility management information server (MMIS)(150).

And then, the MMIS (150) updates cache entries in the mobile node 1 (110) by requesting the MMAA 1 (130) wherein mobile node 1 (110) was previously registered to update binding cache. In the process, the MMIS (150) confirms that mobile node 1 (110) is a node to receive multicast, delivers a registration reply message including an upper connection agent information for receiving multicast data to the 2 MMAA (140).

Meanwhile, in FIG. 3, the above MMAA 2 delivers an aggregated MLD Report message to the content provider network, provided there exists no mobile nodes for receiving about channel "G" in the MMAA 1 (130) and the currently connected MMAA 2 (140).

However, in the case that there already exist mobile node for receiving about the relevant channel, or in the case that there exist mobile node under the MMAA 1 (130) after mobile node 1 (110) handoff, the MMIS (150) informs the content provider network (200) an agent address which is supposed to receive multicast data to avoid unnecessary transmissions of duplicate data. Therefore, in the case that there exist multicast data previously received from the content provider network (200), it forwards the received data by forming the tunnel between the mobility management anchor agent (130)(140). And, the MMAA 2 (140) registers the currently received multicast channel and data with the MMIS (150).

Figure 5:
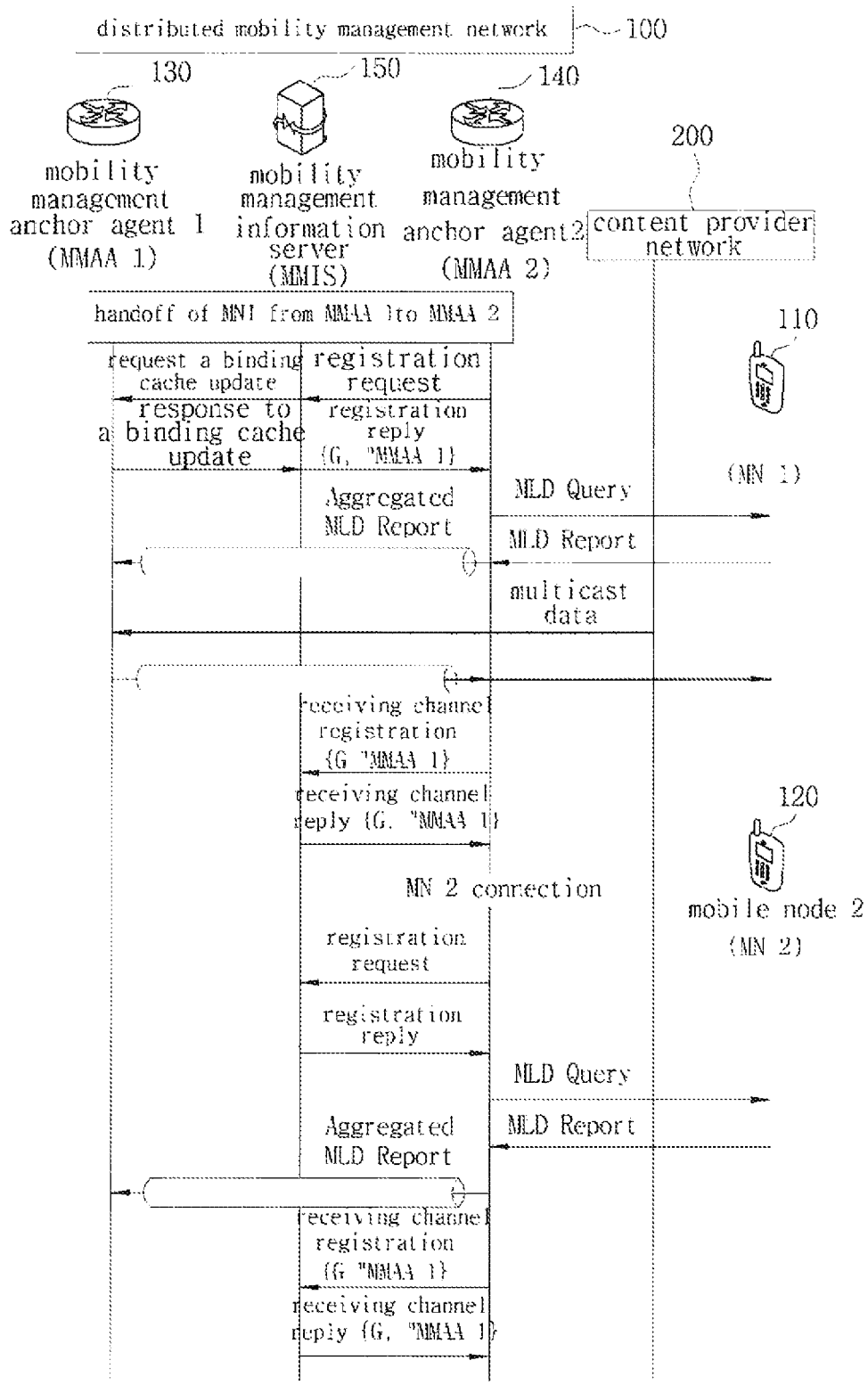
FIG. 5 is a flowchart illustrating a handoff process of the mobile node according to the present invention with a multicast service-providing process when a new mobile node enters.

FIG. 5 is a flowchart illustrating a handoff process of the mobile node according to the present invention with a multicast service-providing process when a new mobile node enters. In the distributed mobility management network, the handoff process of the mobile node 1 (110) with the process for IP multicast support as new mobile node 2 (160) enters will be described in detail with reference to FIG. 5.

First, it is supposed that there exist in the MMAA 1 (130) mobile nodes for receiving multicast channel "G" which was received by the mobile node 1 (110). As a result, when mobile node 1 (110) receives multicast data by handoff to the MMAA 2 (140), the MMAA 2 (140), under the policy decisions of the MMIS (150), forms the tunnel between the mobility management anchor agent (130)(140) with transmitting the aggregated MLD Report message to the MMAA 1 (130), not to the content provider network (200), and then receives multicast data using the tunnel.

Since then, when new mobile node 2 (120) connects to the MMAA 2 (140), the MMAA 2 (140) receives a registration reply message by requesting a registration of the terminal to the MMIS (150). And, as the MMAA 2 (140) is receiving a request receipt of the multicast channel like mobile node 1 (110), it checks the current MLD proxy database and transmits the aggregated MLD Report message of the relevant channel to the MMAA 1 (130). Multicast data is received from the MMAA (130) using the tunnel.

The MMAA 2 (140) with the MLD Report message registers with the MMIS (150) the information on channel information aggregated and received by channel, and information on agent or network transmitting the multicast data for the relevant channel.

Figure 6:
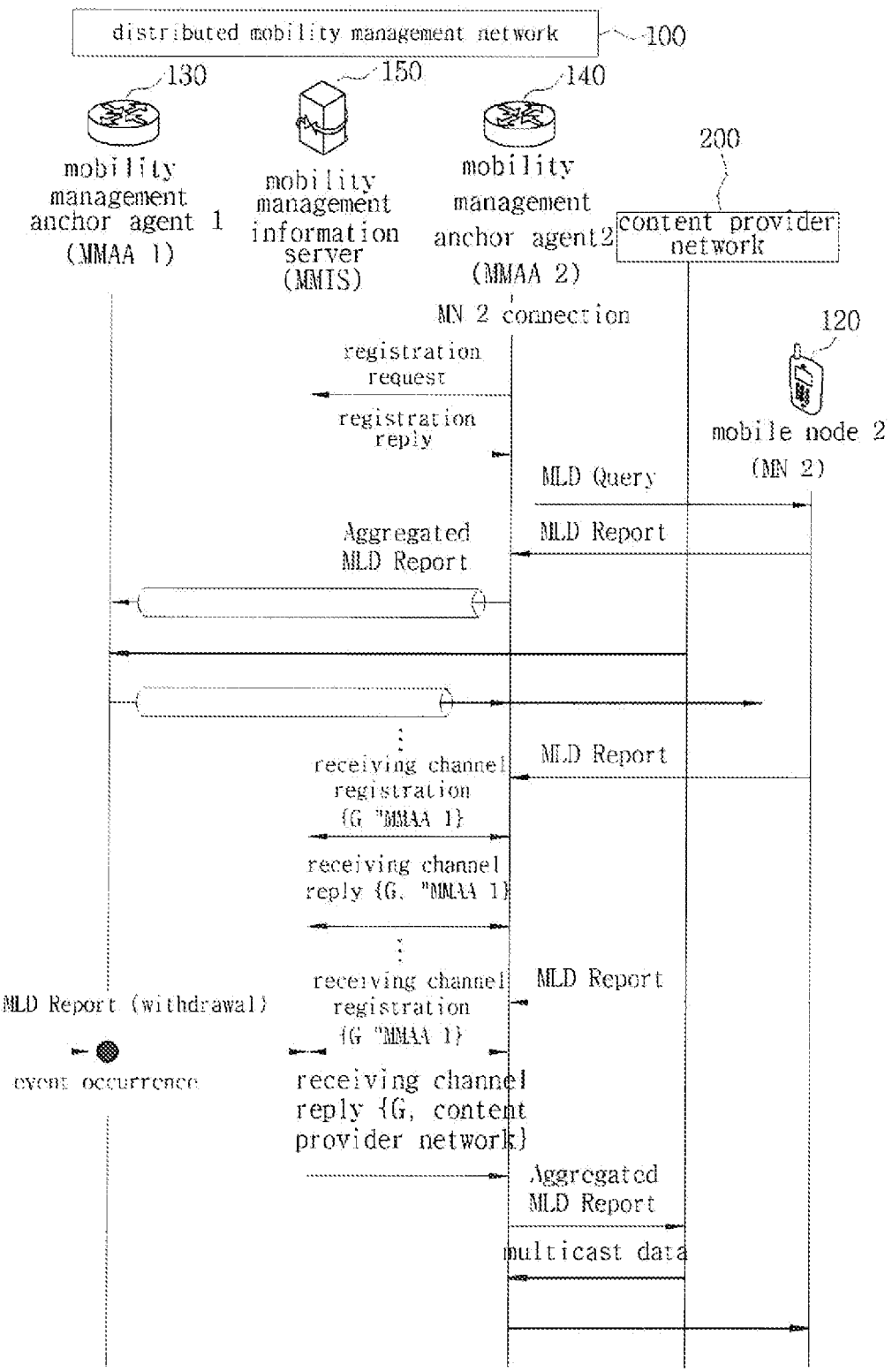
FIG. 6 is a flowchart illustrating a changing process of the multicast data route in accordance with the binding update process according to the present invention.

FIG. 6 is a flowchart illustrating a changing process of the multicast data route in accordance with the binding update process according to the present invention. The method for a changing process of the multicast data route will be described in detail with reference to FIG. 6.

First, the mobile node 2 (120) responses by the MLD Report message when receives the MLD Query message from the MMAA 2 (140) performing MLD proxy functions. And, the MMAA 2 (140) constantly updates to the MMIS (150) on the information about the currently received multicast channel aggregated by channel, agent or network transmitting for the relevant channel Also, the MMAA 1 (130) provides the MMIS (150) with a MLD Report withdrawal message when the event of withdrawal of all the mobile nodes happens. As a result, the MMIS (150) confirms that the MMAA 1 (130) does not receive the relevant channel anymore, after checking in the MMAA 1 (130) whether to currently receive the relevant channel or not.

Since then, the MMIS (150) delivers changed upper connection multicast agent information to the MMAA 2 (140) through a receiving channel registration reply message, the MMAA 2 (140) transmits the aggregated MLD Report message including the receiving channel registration reply message to the content provider network (200), and thus the MMAA (140) can directly receive the multicast data without having to go through the MMAA 1 (130).

As a result, the MMAA 2 (140) receives the multicast data between the MMAA 2 (140) and the content provider network (200) without the tunnel between the MMAA (130). This is effective in reducing the delivery delay time from unnecessary tunneling overhead and data detour.

And, the MMAA 2 (140) registers with the MMIS (150) channel information aggregated and received by channel, and information on agent or network transmitting multicast data for the relevant channel.

Even though the above explained technical spirits of the present invention are specifically described in the preferred embodiments, it is important to note that the above embodiments are just for explanation, not for a limitation on the invention. Also, it will be apparent that one having ordinary skill in the art can make various modifications and changes thereto within the scope of the present invention. Therefore, the true scope of the present invention should be defined by the technical spirits of the appended claims.

What is claimed is:

1. A mobility management system for distributed mobility management network comprising:

a mobile node receiving network access services by conducting wireless communications in the distributed mobility management network through a wireless transmitter-receiver as a device consists of a wireless transmitter-receiver, an antenna and a control unit;

a mobility management anchor agent supporting the mobility of the above mobile node, and taking the role of anchor each time the mobile node moves;

a mobility management information server receiving information on agent or network transmitting multicast channel and data currently received from the above mobility management anchor agent, and then registering and updating the information;

multiple content sources; and a content provider network capable of multicast routing to supply the content, wherein the above mobility management information server checks whether the above mobility management anchor agent currently receives the relevant channel or not, and controls change multicast channel reception to the content provider network.

2. The mobility management system for distributed mobility management network as claimed in claim 1, wherein the above mobility management anchor agent detects a movement of the mobile node by transmitting advertising messages to the above mobile node; establishes and updates binding messages having information on a connection route of the mobile node; and establishes, maintains and terminates a connection route of the mobile node based on the binding information.

3. A mobility management method for distributed mobility management network of the present invention, in providing a network-based mobility comprised of a mobility management anchor agent supporting mobility of the mobile node at its initial connection and a mobility management information server receiving information on agent or network transmitting multicast channel and data currently received from the mobility management anchor agent, comprising the steps of:

requesting a registration by delivering a registration request message including ID of mobile node 1 connected by mobility management anchor agent 1 (MMAA) to the mobility management information server (MMIS);

receiving from MMIS a registration reply message by the above MMAA 1, providing multicast channel information capable of being received by the connected mobile node 1 with transmitting Multicast Listener Discovery (MLD) Query message to the registered mobile node 1, and then checking whether join the multicast channel or not;

the above MMAA 1 receiving, through the above mobile node 1, multicast channel information of its choice included on the MLD Report message in respond to the MLD Query message, and then transmitting aggregated MLD Report message to the content provider network;

receiving and registering information on currently received multicast channel transmitted from the above MMAA 1 by the above MMIS, transmitting agent or network.

4. The mobility management method for distributed mobility management network as claimed in claim 3, wherein the above MMAA 1 and MMAA 2 have MLD proxy functions specified in IETF RFC 4605.

\* \* \* \* \*